United States Patent
Chen

(10) Patent No.: US 11,719,275 B2
(45) Date of Patent: Aug. 8, 2023

(54) COMPOSITE SUCKER AND COMPOSITE SUCTION BRACKET

(71) Applicant: Wistron NeWeb Corporation, Hsinchu (TW)

(72) Inventor: Bo-Yen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 17/524,765

(22) Filed: Nov. 12, 2021

(65) Prior Publication Data
US 2022/0381288 A1   Dec. 1, 2022

(30) Foreign Application Priority Data
May 25, 2021   (TW) .................. 110118771

(51) Int. Cl.
*F16B 47/00*   (2006.01)
*F16M 13/02*   (2006.01)

(52) U.S. Cl.
CPC .......... *F16B 47/006* (2013.01); *F16B 47/003* (2013.01); *F16M 13/02* (2013.01)

(58) Field of Classification Search
CPC ...... F16B 47/006; F16B 47/003; F16M 13/02
USPC ..................................................... 248/218.4
See application file for complete search history.

(56) References Cited

U.S. PATENT DOCUMENTS

| | | | | |
|---|---|---|---|---|
| 4,133,575 A * | 1/1979 | Mader | ............ | B60J 1/20 248/205.8 |
| 6,666,420 B1 * | 12/2003 | Carnevali | ............ | F16B 47/00 248/205.8 |
| 6,932,306 B2 * | 8/2005 | Zou | ............ | F16B 45/00 248/205.5 |
| 7,357,361 B2 * | 4/2008 | Yen | ............ | F16M 11/2064 248/205.8 |
| 7,628,362 B2 * | 12/2009 | Song | ............ | F16B 47/003 248/205.8 |
| 7,690,610 B2 * | 4/2010 | Ristau | ............ | F16B 47/00 248/205.5 |
| 7,850,133 B2 * | 12/2010 | Carnevali | ............ | F16B 47/00 248/205.8 |
| 9,746,022 B2 * | 8/2017 | Shi | ............ | F16B 47/00 |

(Continued)

FOREIGN PATENT DOCUMENTS

CN    201003542 Y    1/2008
KR    101553174 B1    9/2015

*Primary Examiner* — Muhammad Ijaz
(74) *Attorney, Agent, or Firm* — McClure, Qualey & Rodack, LLP

(57) ABSTRACT

A composite sucker is for being sucked on an attached surface. The composite sucker includes a suction element, a pressing element and a pressure adjusting element. The suction element is for being connected to and sucked on the attached surface. The suction element includes a suction elastic portion. An air space is formed between the suction elastic portion and the attached surface. The pressing element is connected to the suction element and includes a pressing elastic portion. The pressing elastic portion is disposed farther away from the attached surface than the suction elastic portion therefrom. The pressure adjusting element is connected to the suction element. The pressure adjusting element is able to drive the suction elastic portion to be deformed, so that a volume of the air space is able to become greater.

15 Claims, 18 Drawing Sheets

(56) References Cited

U.S. PATENT DOCUMENTS

| | | | | |
|---|---|---|---|---|
| 2006/0289708 | A1* | 12/2006 | Lin | B60R 11/00 |
| | | | | 248/160 |
| 2007/0241246 | A1* | 10/2007 | Ristau | F16B 47/00 |
| | | | | 248/206.2 |
| 2012/0097820 | A1* | 4/2012 | Hajianpour | F16B 47/00 |
| | | | | 248/363 |
| 2012/0112023 | A1* | 5/2012 | Tollman | F16B 47/006 |
| | | | | 248/205.8 |
| 2014/0374553 | A1* | 12/2014 | Park | F16B 47/00 |
| | | | | 248/205.5 |
| 2015/0330438 | A1* | 11/2015 | Shi | F16B 47/006 |
| | | | | 248/205.8 |
| 2016/0215813 | A1* | 7/2016 | Huang | A47G 1/17 |

* cited by examiner

US 11,719,275 B2

COMPOSITE SUCKER AND COMPOSITE SUCTION BRACKET

RELATED APPLICATIONS

This application claims priority to Taiwan Application Serial Number 110118771, filed on May 25, 2021, which is herein incorporated by reference.

BACKGROUND

Technical Field

The present disclosure relates to a composite sucker and a composite suction bracket. More particularly, the present disclosure relates to a composite sucker and a composite suction bracket applying the principle of the air pressure difference between the inside and the outside thereof.

Description of Related Art

Driven by humans' pursuit of convenient life, no matter in industrial, commercial or residential environments, it is common to require objects to be installed and fixed on walls, ceilings, roofs, railings, and windowsills. However, if a drilled fixation manner is used, a screw is further required for locking to be fixed, and the installation procedure is too complicated to install by the user (i.e., installer) himself or herself.

Furthermore, when an object is required to be fixed on a wall or a glass, it will not be convenient and reusable to employ an adhesive tape. If a conventional sucker (i.e., suction cup) is used, the conventional sucker being well or poorly attached on an attached surface depends on whether the installation in accordance with the standard operating procedure (SOP) being executed by the user. After being attached on the attached surface, once the conventional sucker is not pressed by the user, the sucker cannot be well attached and sucked on the attached surface so as to have a risk of falling off.

Given the above, there is an urgent need in the market for a composite sucker and a composite suction bracket, which are featured with forcing to properly install the composite sucker and the composite suction bracket, so as to prevent from the risk caused by the user's improper installation, and simultaneously have more convenient installation and better sucking capability.

SUMMARY

According to one aspect of the present disclosure, a composite sucker is for being sucked on an attached surface. The composite sucker includes a suction element, a pressing element and a pressure adjusting element. The suction element is for being connected to and sucked on the attached surface. The suction element includes a suction elastic portion. An air space is formed between the suction elastic portion and the attached surface. The pressing element is connected to the suction element and includes a pressing elastic portion. The pressing elastic portion is disposed farther away from the attached surface than the suction elastic portion therefrom, and the pressing elastic portion and the suction elastic portion are driven to be deformed by each other. The pressure adjusting element is connected to the suction element. The pressure adjusting element is able to drive the suction elastic portion to be deformed, so that a volume of the air space is able to become greater.

According to another aspect of the present disclosure, a composite suction bracket is for being sucked on an attached surface to support an object. The composite suction bracket includes a suction element, an adhesive element, a pressure adjusting element and a bracket element. The suction element is for being connected to and sucked on the attached surface. The suction element includes a suction elastic portion. An air space is formed between the suction elastic portion and the attached surface. The adhesive element is for being connected and adhering to the attached surface. Each of the suction element and the adhesive element is connected between the attached surface and the pressure adjusting element. The pressure adjusting element is able to drive the suction elastic portion to be deformed, so that a volume of the air space is able to become greater. The bracket element is connected to at least one of the suction element, the adhesive element and the pressure adjusting element for supporting the object.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
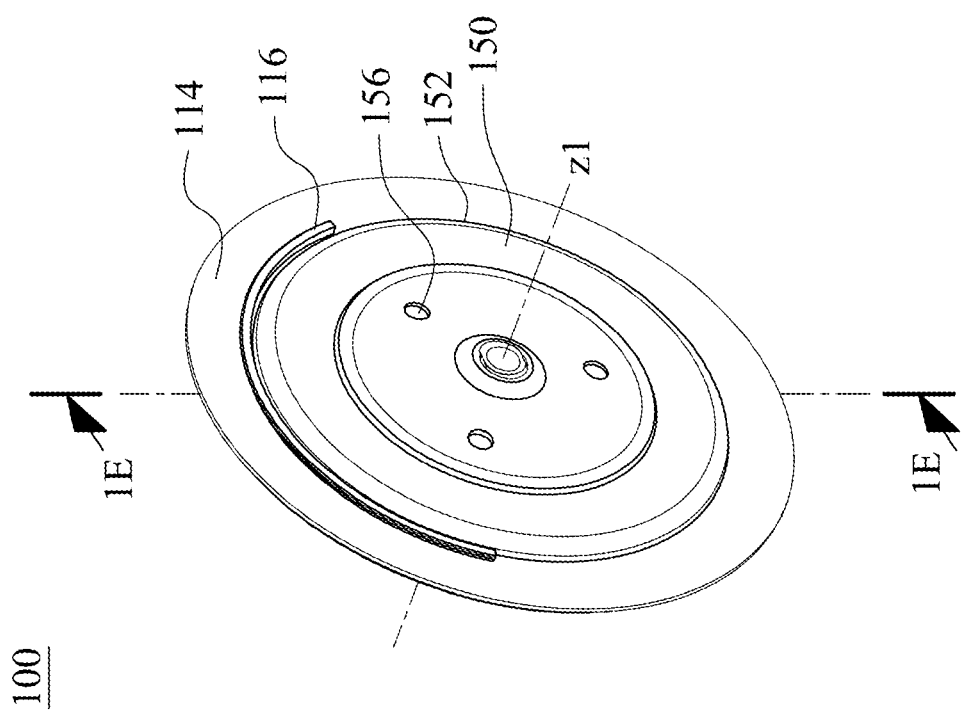
FIG. 1A is a three-dimensional view of a composite sucker according to the 1st embodiment of the present disclosure.
Figure 1B:
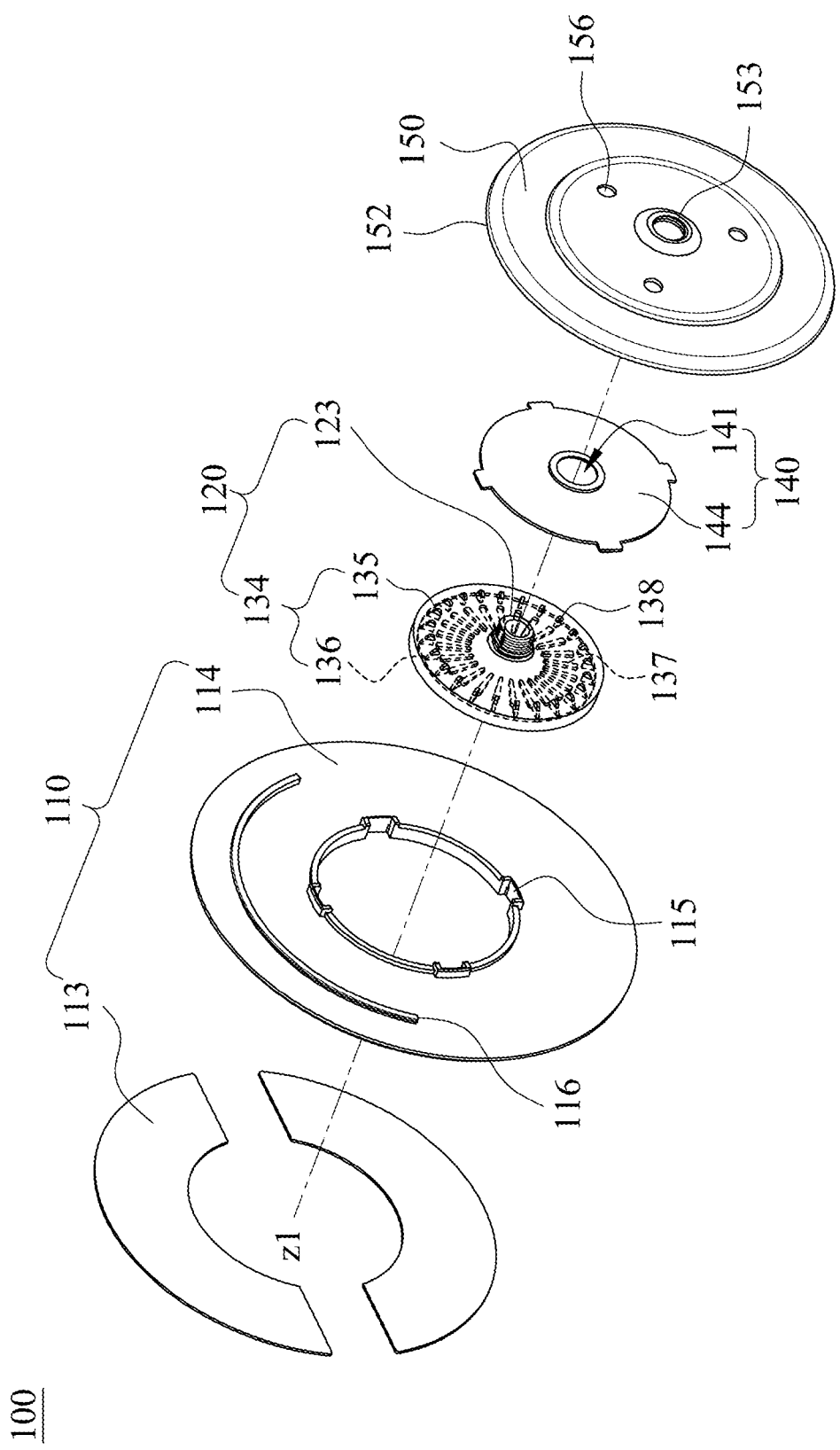
FIG. 1B is an exploded view of the composite sucker in FIG. 1A.
Figure 1C:
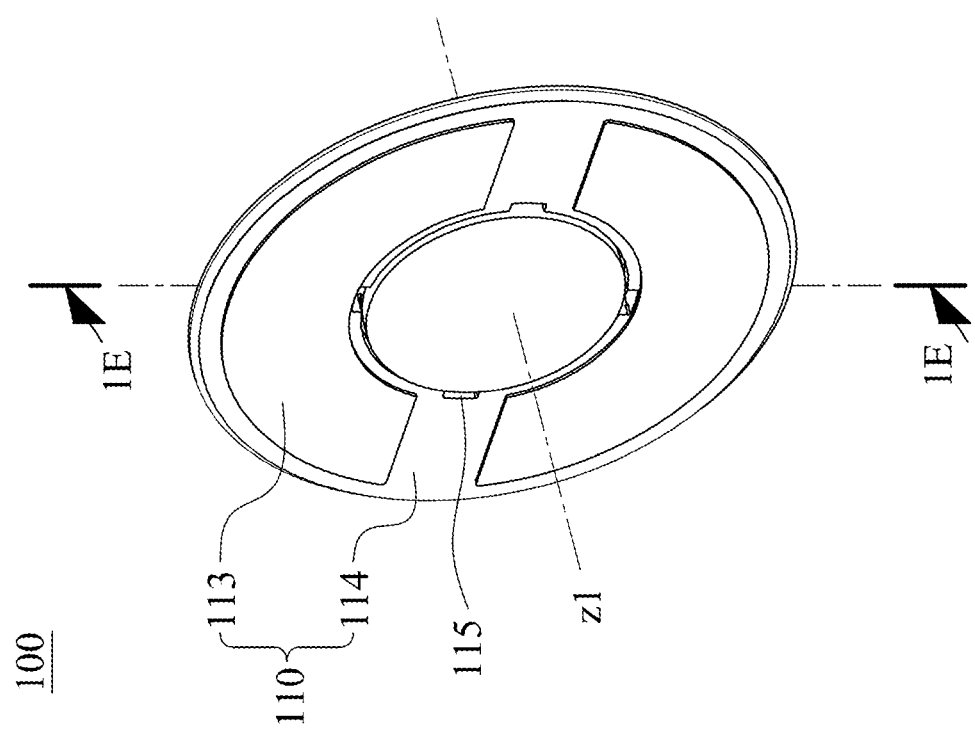
FIG. 1C is another three-dimensional view of the composite sucker according to the 1st embodiment.
Figure 1D:
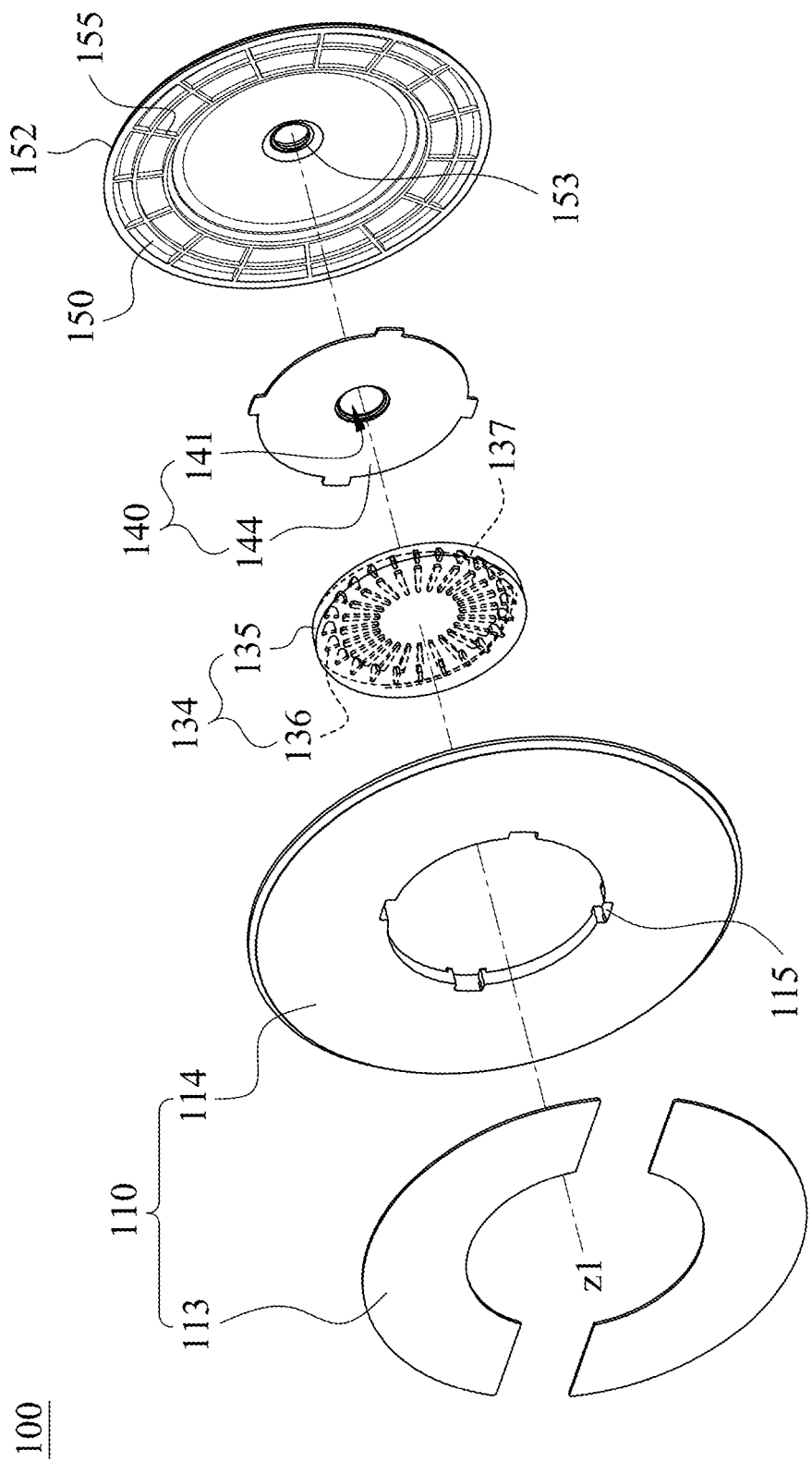
FIG. 1D is an exploded view of the composite sucker in FIG. 1C.
Figure 1E:
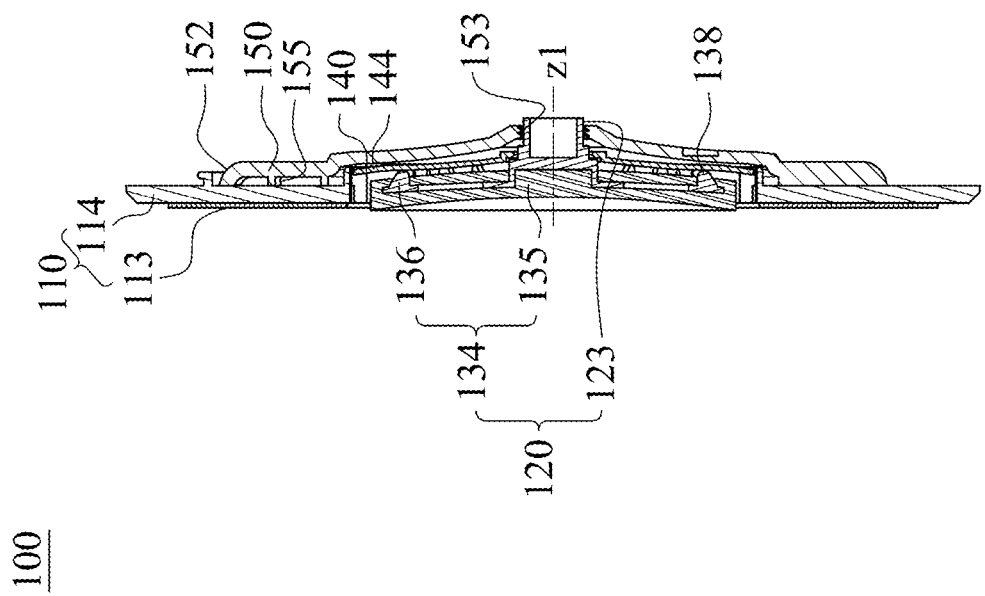
FIG. 1E is a cross-sectional view along line 1E-1E of the composite sucker in FIG. 1A.
Figure 1F:
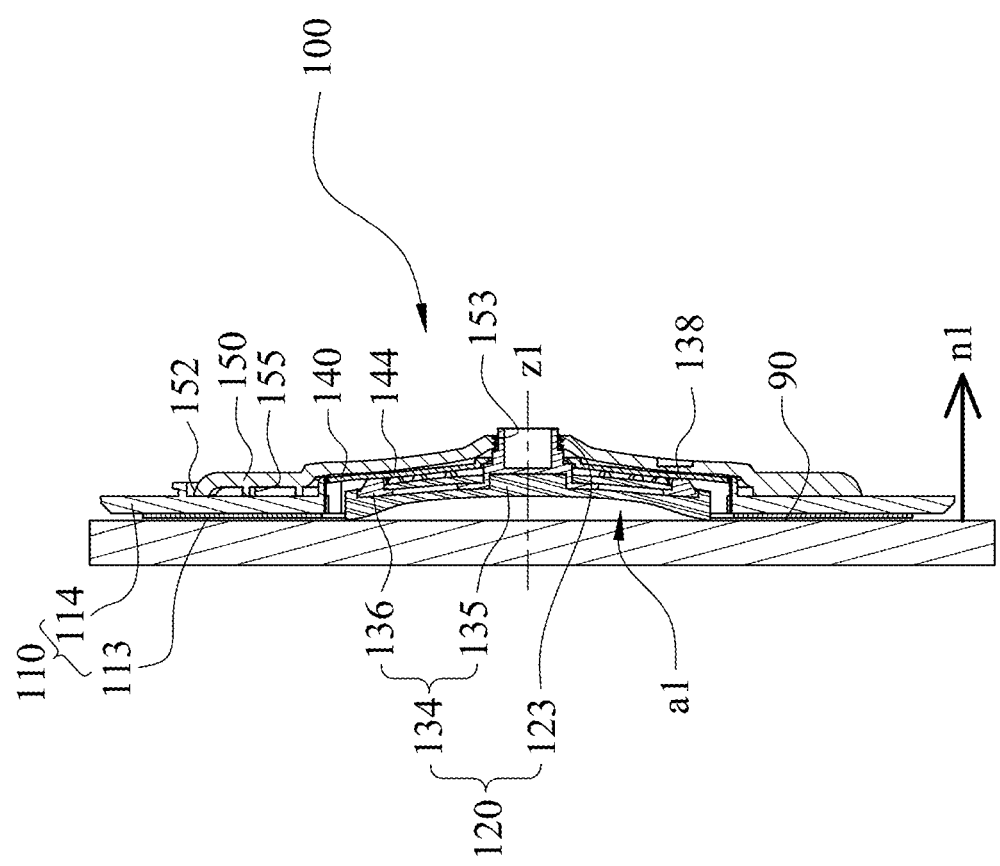
FIG. 1F is a cross-sectional view of the composite sucker according to the 1st embodiment in a usage state.

FIG. 1A is a three-dimensional view of a composite sucker 100 according to the 1st embodiment of the present disclosure. FIG. 1B is an exploded view of the composite sucker 100 in FIG. 1A. FIG. 1C is a three-dimensional view from another view angle of the composite sucker 100 according to the 1st embodiment. FIG. 1D is an exploded view of the composite sucker 100 in FIG. 1C. FIG. 1E is a cross-sectional view along line 1E-1E of the composite sucker 100 in FIG. 1A. FIG. 1F is a cross-sectional view of the composite sucker 100 according to the 1st embodiment in a usage state of being sucked on an attached surface 90. With reference to FIG. 1A to FIG. 1F, the composite sucker 100 is for being sucked on the attached surface 90 of an attached object. The composite sucker 100 includes a suction element 120 and a pressure adjusting element 150. In the 1st embodiment, the attached surface 90 is specifically a window of glass material. The composite sucker 100 itself or being connected with another element can be a suspension bracket, a placement bracket, or an ornament, and not limited thereto. According to another embodiment of the present disclosure (not shown in drawings), a material of an attached surface may be glass, tile and plastic, and the attached surface may be a window, a wall, a ceiling, or a flat surface of any material having any angle with respect to the ground.

The suction element 120 is for being connected to and sucked on the attached surface 90. The suction element 120 includes a suction elastic portion 134. An air space a1 is formed between the suction elastic portion 134 and the attached surface 90. The pressure adjusting element 150 is connected to the suction element 120. The pressure adjusting element 150 is able to drive the suction elastic portion 134 to be deformed, so that a volume of the air space a1 is able to become greater. Accordingly, based on the ideal gas equation of state, when an air amount of the air space a1 is fixed, a pressure and a volume of the air space a1 are inversely proportional. Thus, when the suction elastic portion 134 is driven by the pressure adjusting element 150 to be deformed, and the volume of the air space a1 becomes greater, the pressure of the air space a1 becomes smaller and is further smaller than an ambient air pressure (i.e., atmospheric pressure) outside the composite sucker 100. That is, when an air pressure difference between the inside and the outside of the composite sucker 100 becomes greater, a pressing force applied on the composite sucker 100 toward the attached surface 90 by the ambient air becomes further greater, thereby the composite sucker 100 can be more firmly fixed on the attached surface 90, and a greater force is required to make the composite sucker 100 fall off from the attached surface 90. Furthermore, an inside of a composite sucker and an air space a1 stated in the present disclosure indicate a space occupied by the air from the composite sucker toward an attached surface, and an outside of the composite sucker and an ambience stated in the present disclosure indicate a space occupied by the air from the composite sucker toward being away from an attached surface.

In detail, the composite sucker 100 may further include a pressing element 140. The pressing element 140 is connected to the suction element 120 and includes a pressing elastic portion 144. The pressing elastic portion 144 is disposed farther away from the attached surface 90 than the suction elastic portion 134 therefrom, and the pressing elastic portion 144 and the suction elastic portion 134 are driven to be deformed by each other. Therefore, in an installing procedure of the composite sucker 100, an additional force, which is a restoring force resulted from the deformation of the pressing element 140, is applied on the suction elastic portion 134, and thereby it is advantageous in increasing the closeness between the suction elastic portion 134 and the attached surface 90.

The composite sucker 100 may further include an adhesive element 110 for being connected and adhering to the attached surface 90. Each of the suction element 120 and the adhesive element 110 is connected between the attached surface 90 and the pressure adjusting element 150. When the suction elastic portion 134 of the suction element 120 is driven to be deformed by an internal threaded portion 153 of the pressure adjusting element 150, the volume of the air space a1 becomes greater, and the pressure adjusting element 150 is connected to the adhesive element 110, a pressure applied on the adhesive element 110 by the pressure adjusting element 150 can become greater. Therefore, when the pressing force from the ambient air applied on the composite sucker 100 toward the attached surface 90 is enlarged, which is resulted from enlarging the air pressure difference between the inside and the outside thereof, the pressure (i.e., pressing force) applied on the adhesive element 110 by the pressure adjusting element 150 is also enlarged, the pressing force applied on the overall composite sucker 100 toward the attached surface 90 is further enlarged. Thus, a normal force applied on the composite sucker 100 by the attached surface 90 is enlarged, a friction between the composite sucker 100 and the attached surface 90 is enlarged, and thereby the composite sucker 100 is advantageous in preventing from being detached from the attached surface 90 and being more firmly fixed on the attached surface 90.

Figure 1H:
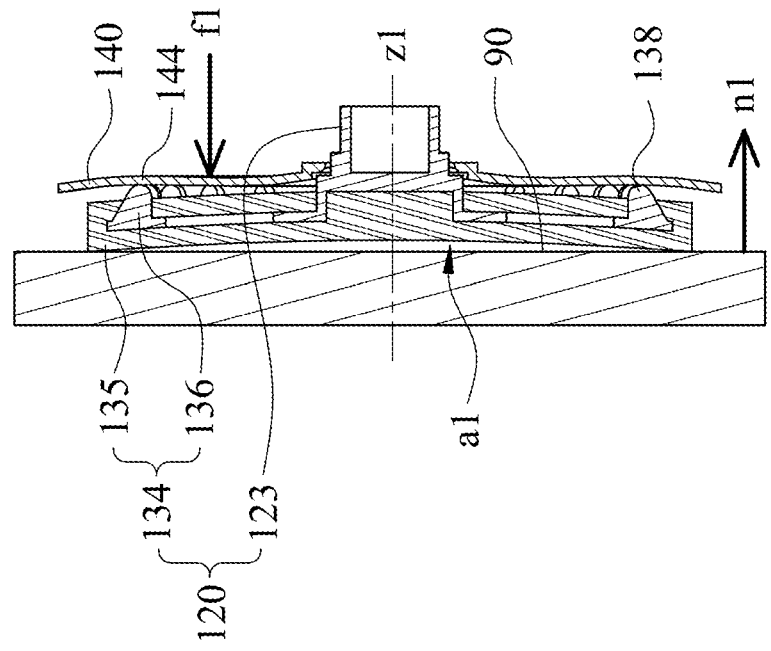
FIG. 1H is a schematic view of a second installing step of the composite sucker according to the 1st embodiment.
Figure 1G:
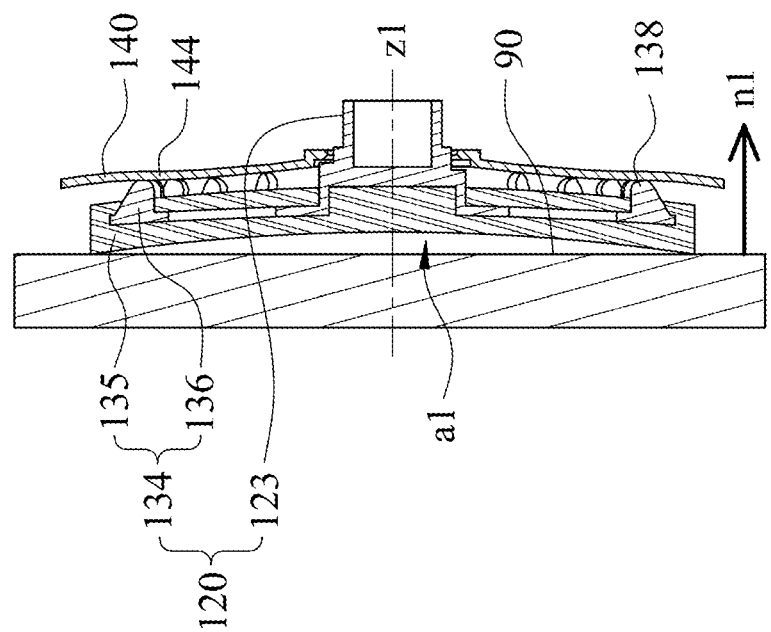
FIG. 1G is a schematic view of a first installing step of the composite sucker according to the 1st embodiment.
Figure 1J:
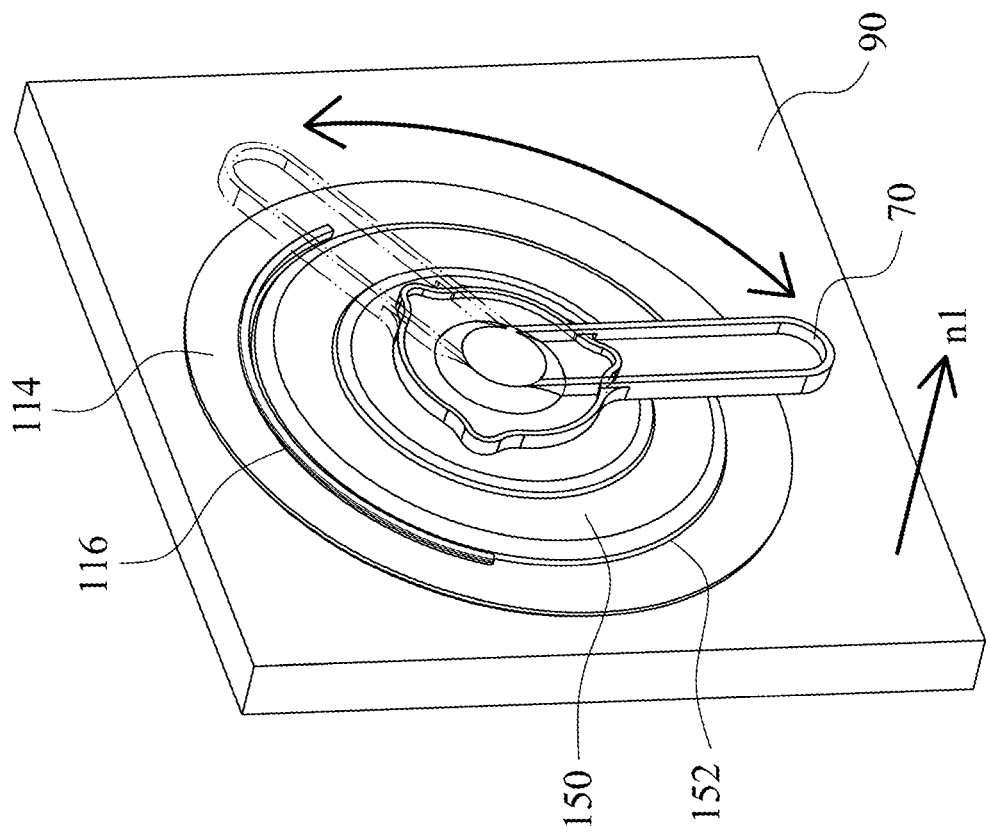
FIG. 1J is a schematic view of a fourth installing step of the composite sucker according to the 1st embodiment.
Figure 1I:
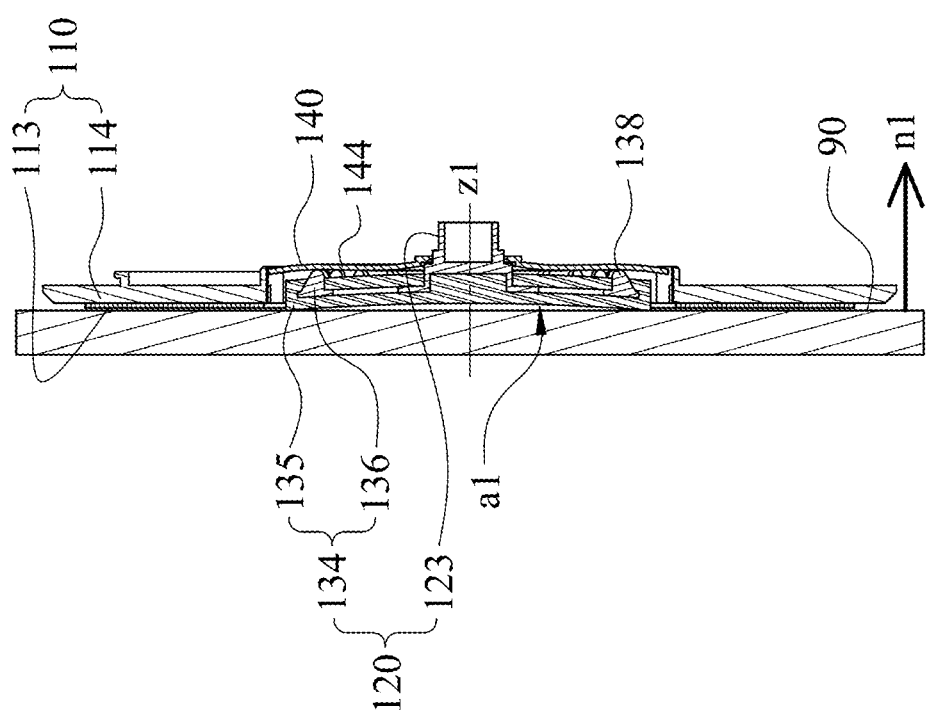
FIG. 1I is a schematic view of a third installing step of the composite sucker according to the 1st embodiment.

FIG. 1G is a schematic view of a first installing step of the composite sucker 100 according to the 1st embodiment. FIG. 1H is a schematic view of a second installing step of the composite sucker 100 according to the 1st embodiment. FIG. 1I is a schematic view of a third installing step of the composite sucker 100 according to the 1st embodiment. FIG. 1J is a schematic view of a fourth installing step of the composite sucker 100 according to the 1st embodiment. FIG. 1G to FIG. 1J are the schematic views in order of an installing procedure of the composite sucker 100, and FIG. 1F is the schematic view of the composite sucker 100 in the usage state after installing. For example, with reference to FIG. 1G, the first installing step of installing the composite sucker 100 includes taking the suction element 120 and the pressing element 140 connected to each other to be sucked (attracted) on the attached surface 90, and the pressing elastic portion 144 is disposed farther away from the attached surface 90 than the suction elastic portion 134 therefrom.

With reference to FIG. 1H, the suction element 120 may further include an external threaded portion 123. The suction elastic portion 134 of the suction element 120 may surround and be connected to the external threaded portion 123 thereof. The pressing element 140 may further include an opening 141, and the pressing element 140 is sleeved (coupled) around the external threaded portion 123 via the opening 141. Specifically, the suction elastic portion 134 is circular-disk-shaped, and a surface of the suction elastic portion 134 toward the attached surface 90 is a concave surface. The pressing elastic portion 144 is circular-disk-shaped with the opening 141 at a center thereof. A diameter of the pressing elastic portion 144 is greater than a diameter of the suction elastic portion 134. That is, an outer edge projected on the attached surface 90 of the pressing elastic portion 144 surrounds an outer edge projected on the attached surface 90 of the suction elastic portion 134, and it can be said that a projected area on the attached surface 90 of the pressing elastic portion 144 covers a projected area on the attached surface 90 of the suction elastic portion 134. The second installing step of installing the composite sucker 100 includes applying an external force f1 (e.g., by a user's hand of the composite sucker 100) toward the attached surface 90 on the suction elastic portion 134 via the pressing elastic portion 144. Thus, the suction elastic portion 134 is driven to be deformed by the pressing elastic portion 144, and the volume of the air space a1 becomes further smaller. Therefore, the additional force, which is the restoring force resulted from the deformation of the pressing element 140, is applied on the suction elastic portion 134. It is thereby advantageous in increasing the closeness between the suction elastic portion 134 and the attached surface 90, reducing a leakage of the ambient air into the air space a1 inside the composite sucker 100, maintaining the tightness of the air space a1 inside the composite sucker 100 and prolonging the service life of the composite sucker 100.

Specifically, as shown in FIG. 1A to FIG. 1D and FIG. 1H, the suction elastic portion 134 may include a backbone unit 136 and a filling unit 135. The backbone unit 136 surrounds the external threaded portion 123 and includes a radial-shaped backbone 137. The radial-shaped backbone 137 is extended outward to form a plurality of abutting blocks 138. The filling unit 135 covers parts of the radial-shaped backbone 137, and the abutting blocks 138 are exposed from the filling unit 135. The abutting blocks 138 are abutted with the pressing elastic portion 144 of the pressing element 140, and an elasticity of the pressing elastic portion 144 is smaller than an elasticity of the suction elastic portion 134. Accordingly, it is beneficial to the user to apply the external force f1 on the pressing elastic portion 144 in the second installing step (as shown in FIG. 1H) so as to increase the closeness between the suction elastic portion 134 and the attached surface 90. Furthermore, each of the pressing element 140 and the backbone unit 136 of the suction element 120 may be made of a plastic material (e.g., polycarbonate, PC). The backbone unit 136 and the external threaded portion 123 may be made of the same material and formed integrally. The filling unit 135 may be made of a rubber material. The backbone unit 136 and the filling unit 135 may be made by a dual-shot injection molding method.

With reference to FIG. 1I, the third installing step of installing the composite sucker 100 includes taking the adhesive element 110 to be aligned along the suction element 120 and the pressing element 140 and then to be adhered to the attached surface 90.

Specifically, as shown in FIG. 1A to FIG. 1D and FIG. 1I, the adhesive element 110 may include an adhesive unit 113 and an adapter unit 114. The adhesive unit 113 has adhesiveness. The adhesive unit 113 is for being connected and adhering between the attached surface 90 and the adapter unit 114. Consequently, the adhesion property of the adhesive unit 113 and the support property of the adapter unit 114 are advantageous in enhancing the sucking stability and design flexibility of the composite sucker 100. In the 1st embodiment, the adapter unit 114 may be made of a plastic material (e.g., ABS, acrylonitrile butadiene styrene). A number of the adhesive unit 113 is two. Each of the adhesive units 113 is in a semicircularly annular shape, and the two adhesive units 113 are evenly and symmetrically arranged on the adapter unit 114. In other embodiment of a composite sucker according to the present disclosure (not shown in drawings), a plurality of adhesive units may be arranged as a radial, a matrix or any irregular shape to be configured on an adapter unit.

Each of the adhesive units 113 may be a bio-inspired tape. Therefore, the bio-inspired tape is a micro-structured silicone fastener film with about tens of thousands gripping elements per cm square. Based on Van der Waals forces of attraction, the bio-inspired tape is featured with high adhesion strength and leaving no residue. Thus, the composite sucker 100 aided with the adhesive units 113 has well sucking and reusable properties. In addition, each of the adhesive units 113 may be made of an adhesive material with the reusable property, such as a water-washed glue, a non-marking tape, etc., or may be made of an adhesive material without the reusable property.

The suction element 120 and the adhesive element 110 may be not connected to each other. The adhesive element 110 is annular-shaped and surrounds the suction element 120. Accordingly, in the third installing step, as the adhesive element 110 surrounds the suction element 120 and the pressing element 140 and then to be adhered to the attached surface 90, the adhesive element 110 is beneficial to neither contact nor push the suction element 120 and the pressing element 140, so as to prevent the closeness between the suction element 120 and the pressing element 140 from being damaged.

With reference to FIG. 1J, the fourth installing step of installing the composite sucker 100 includes installing the pressure adjusting element 150 to be connected to the suction element 120 by a rotating tool 70. A plurality of positioning structures (not shown in drawings) of the rotating tool 70 are correspondingly connected to a plurality of positioning structures 156 of the pressure adjusting element 150, respectively. Specifically, as shown in FIG. 1A to FIG. 1D and FIG. 1J, the suction element 120 may further include the external threaded portion 123, the pressure adjusting element 150 may include the internal threaded portion 153, and the external threaded portion 123 and the internal threaded portion 153 are correspondingly connected to each other. The suction elastic portion 134 of the suction element 120 is driven to be deformed by the internal threaded portion 153 while the pressure adjusting element 150 being rotated by the rotating tool 70, and the volume of the air space a1 can be enlarged. Therefore, as a number of rotations is gradually increased during rotating the pressure adjusting element 150, the external threaded portion 123 is pulled by the internal threaded portion 153 to gradually move away from the attached surface 90. The suction elastic portion 134 driving and together with the pressing elastic portion 144 are deformed to have a swelling shape. At the same time, the volume of the air space a1 becomes greater (as shown in FIG. 1J), and a swelling degree of the suction elastic portion 134 shown in FIG. 1J is greater than an original swelling degree of the suction elastic portion 134 shown in FIG. 1E. Hence, the composite sucker 100 is advantageous in gradually pulling to enlarge the volume of the air space a1 for the user, and increasing the air pressure difference between the air space a1 and the ambient, so as to be fixed on the attached surface 90 more stably.

Each of the external threaded portion 123 and the internal threaded portion 153 may be disposed and extended along a central axis z1 of the composite sucker 100, and the central axis z1 is parallel to a normal direction n1 of the attached surface 90. An outer edge projected on the attached surface 90 of the pressure adjusting element 150 surrounds an outer edge projected on the attached surface 90 of the suction element 120. Therefore, the suction elastic portion 134 of the suction element 120 can be driven to be deformed by the internal threaded portion 153 of the pressure adjusting element 150, and thereby the volume of the air space a1 can become greater. The pressure adjusting element 150 may be connected to the adhesive element 110 and include a protruding structure 155, which is close to an outer annular surface 152 of the pressure adjusting element 150. The protruding structure 155 may be connected to the adapter unit 114 of the adhesive element 110. In the 1st embodiment, the protruding structure 155 is meshed to form an annular shape (but not limited thereto). When the pressure adjusting element 150 is rotated to approach the adapter unit 114, the protruding structure 155 can be abutted with the adapter unit 114. Thus, an additional force being 360-degree around and uniform can be additionally applied on the adhesive units 113, and a pressure applied on the adhesive element 110 by the pressure adjusting element 150 becomes greater. The pressure adjusting element 150 thereby simultaneously achieves two effects. One thereof is the suction elastic portion 134 being swelled to enlarge the air pressure difference between the inside and the outside of the composite sucker 100, the other thereof is implementing a better and more completed contact and attachment between the adhesive units 113 and the attached surface 90, and the composite sucker 100 is fixed on the attached surface 90 more stably. The pressure adjusting element 150 may be made of a plastic material (e.g., ABS). In addition, besides the effects of forcing the suction elastic portion 134 of the composite sucker 100 more tightly attached to the attached surface 90 and simultaneously applying the pressure on the adhesive element 110, another effect of rotating the pressure adjusting element 150 by the rotating tool 70 is forcing the user to properly install the composite sucker 100 via a specific step (i.e., the fourth installing step), so as to ensure the composite sucker 100 with a sufficient suction after installing and avoid the risk of falling off caused by improper installation by the user. Moreover, based on satisfying the usage requirements, the user may adjust the order of the aforementioned installing steps, or omit at least one installing step.

With reference to FIG. 1F, after finishing the fourth installing step and removing the rotating tool 70 from the composite sucker 100, the installing steps of the installing procedure of the composite sucker 100 are completed, as shown in FIG. 1F. Therefore, in the installing procedure of the composite sucker 100, the pressing element 140 and the pressure adjusting element 150 in order are employed to increase the air pressure difference between the inside and the outside of the composite sucker 100, and the pressure adjusting element 150 is simultaneously employed to increase the force applied on the adhesive element 110 and thereby further enlarge the friction between the composite sucker 100 and the attached surface 90, so as to more firmly fix the composite sucker 100 on the attached surface 90. In other embodiment according to the present disclosure (not shown in drawings), a pressing element and a pressure adjusting element of a composite sucker may be integrated into a single piece. When the composite sucker is being installed, a part of the single piece can drive and intensify a deformation of a suction elastic portion thereof so as to enhance a closeness between the suction elastic portion and an attached surface, and another part of the single piece can also drive a deformation of the suction elastic portion thereof so as to enlarge an volume of an air space between the suction elastic portion and the attached surface.

Figure 2A:
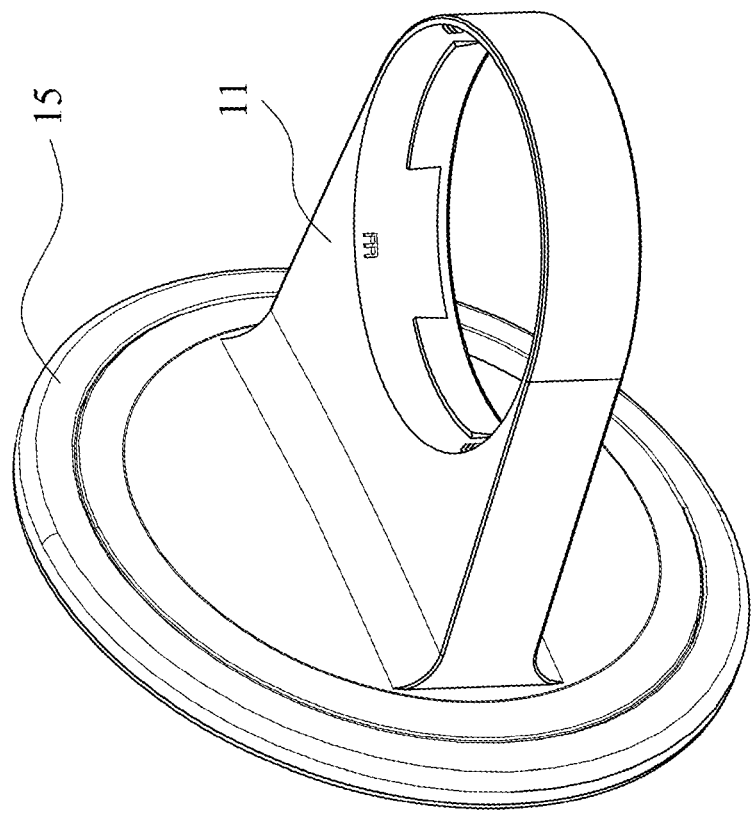
FIG. 2A is a three-dimensional view of a composite suction bracket according to the 2nd embodiment of the present disclosure.
Figure 2B:
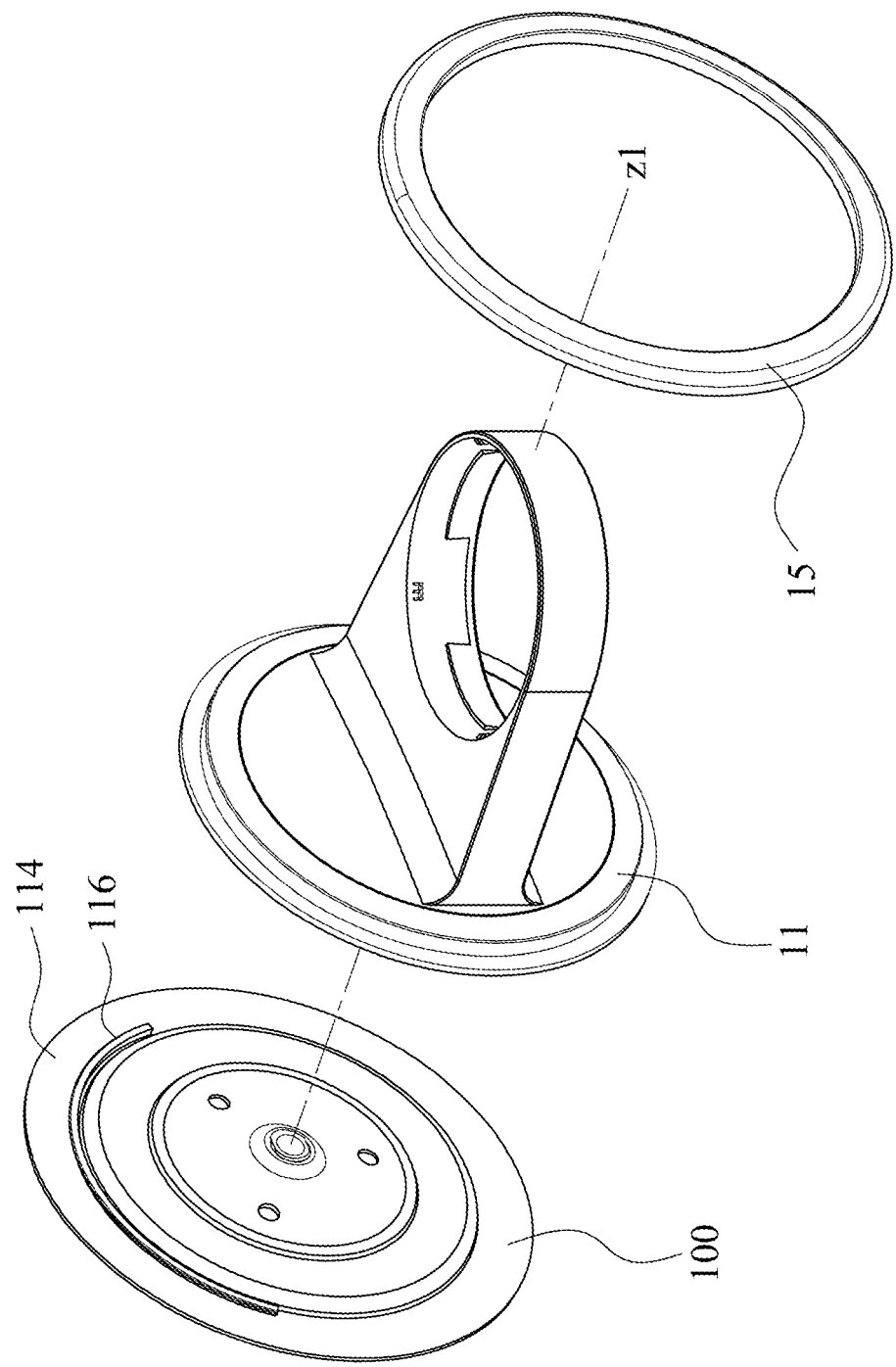
FIG. 2B is an exploded view of the composite suction bracket in FIG. 2A.
Figure 2C:
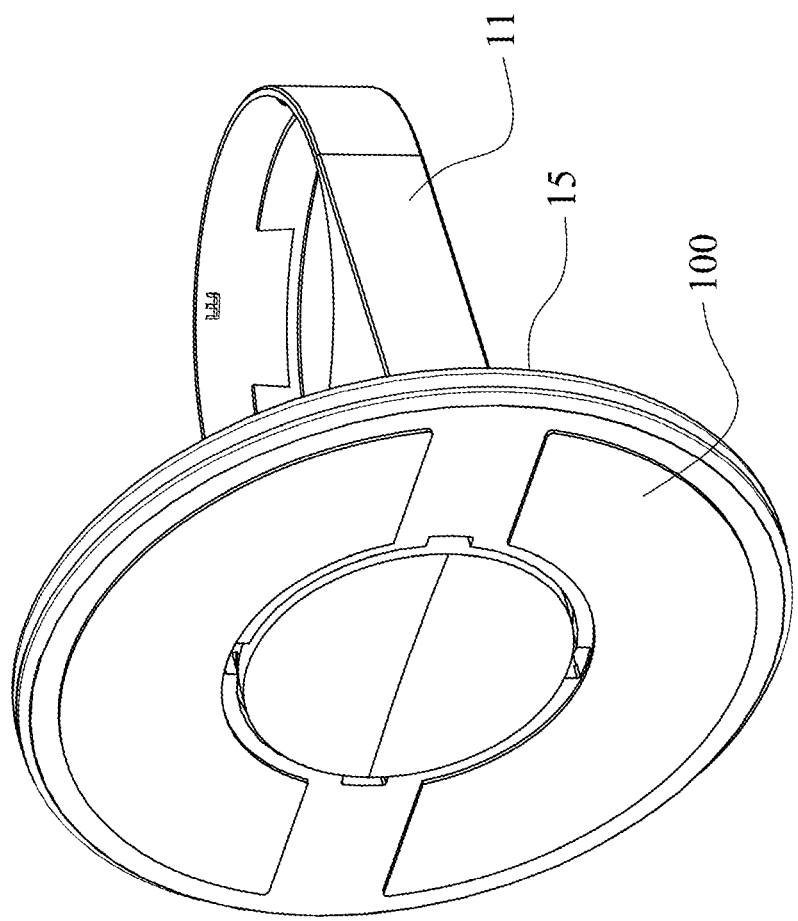
FIG. 2C is another three-dimensional view of the composite suction bracket according to the 2nd embodiment.
Figure 2D:
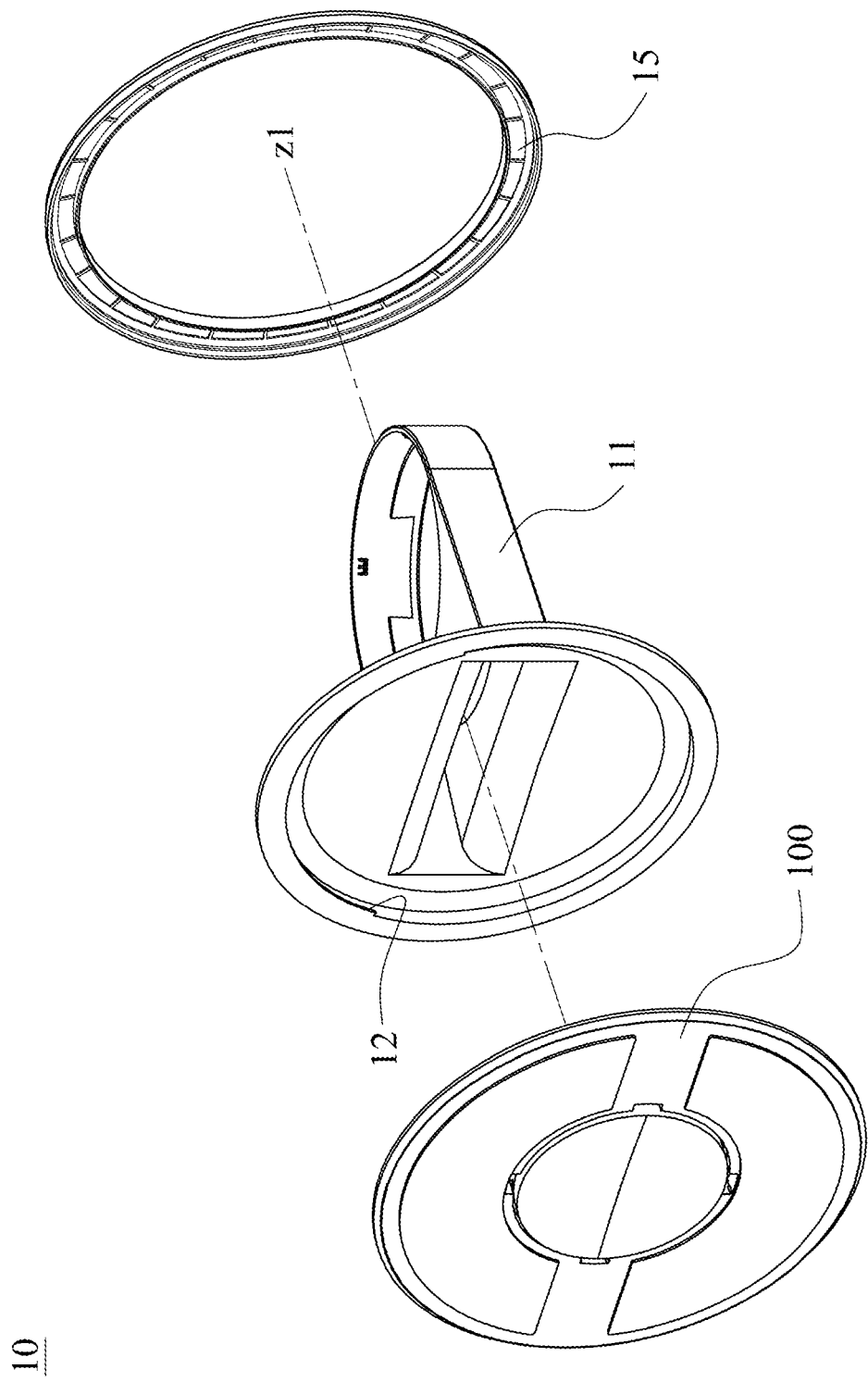
FIG. 2D is an exploded view of the composite suction bracket in FIG. 2C.
Figure 2E:
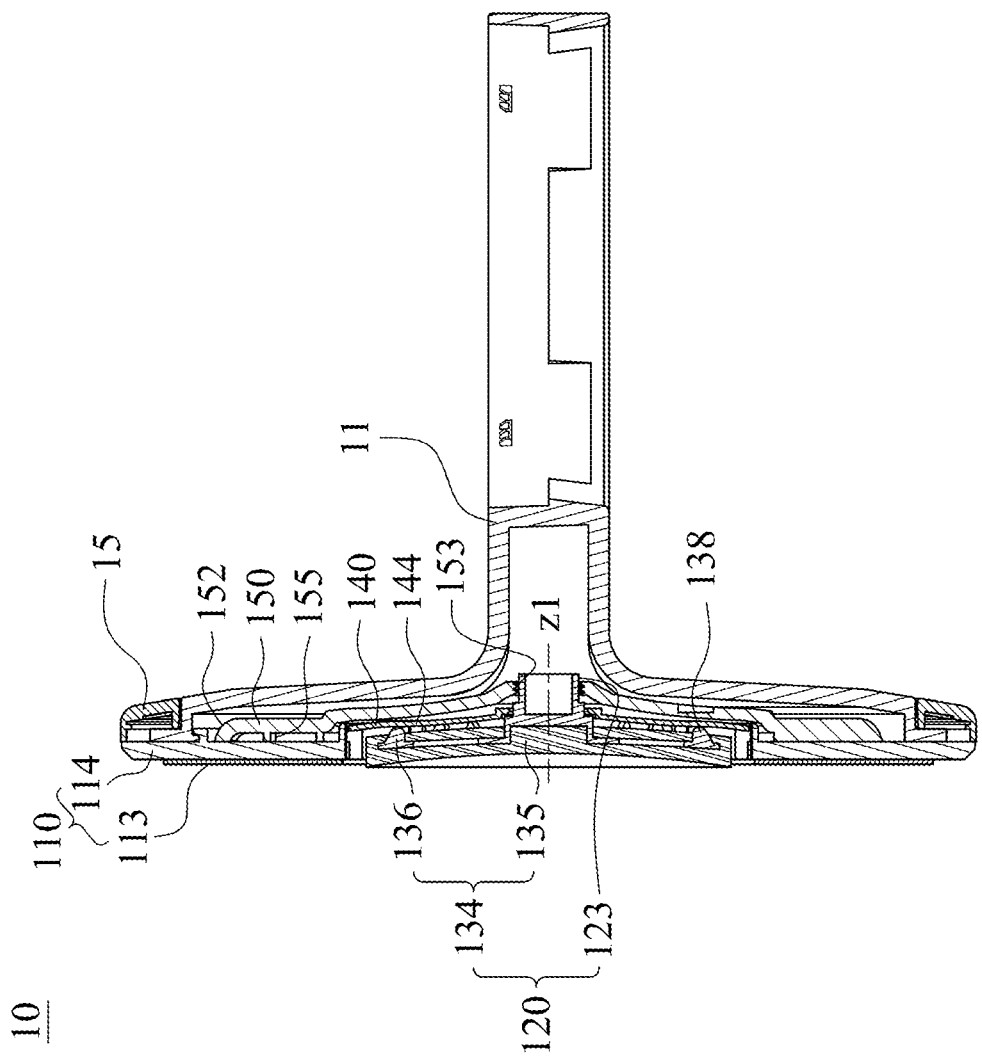
FIG. 2E is a cross-sectional view of the composite suction bracket according to the 2nd embodiment.

FIG. 2A is a three-dimensional view of a composite suction bracket 10 according to the 2nd embodiment of the present disclosure. FIG. 2B is an exploded view of the composite suction bracket 10 in FIG. 2A. FIG. 2C is a three-dimensional view from another view angle of the composite suction bracket 10 according to the 2nd embodiment. FIG. 2D is an exploded view of the composite suction bracket 10 in FIG. 2C. FIG. 2E is a cross-sectional view of the composite suction bracket 10 according to the 2nd embodiment. With reference to FIG. 1B, FIG. 1D and FIG. 2A to FIG. 2E, the composite suction bracket 10 is for being sucked on the attached surface 90 to support an object (not shown in drawings). The composite suction bracket 10 includes the suction element 120, the adhesive element 110, the pressure adjusting element 150 and a bracket element 11. The bracket element 11 is connected to at least one of the suction element 120, the adhesive element 110 and the pressure adjusting element 150 for supporting the object. In the 2nd embodiment, the bracket element 11 is specifically connected to the adhesive element 110, and not connected to the suction element 120 and the pressure adjusting element 150. Therefore, the composite suction bracket 10 is advantageous in more stably supporting the heavier object.

Furthermore, with the rise of the wireless communication systems such as the 5th Generation Wireless Systems (5G), besides the existing frequency bands below 6 GHz, the frequency bands of the millimeter wave (mmWave), e.g., 24-28 GHz, 37-49 GHz and 64-71 GHz, are also employed. The millimeter wave is featured with high frequency and large bandwidth so as to have the characteristics of high transmission capability and low latency. However, the millimeter wave is more restricted by terrain due to the shorter wavelength and lower penetration so as only to allow a short transmission distance. The composite suction bracket 10 according to the present disclosure is beneficial to support a 5G apparatus (e.g., a base station, a repeater, a terminal apparatus, etc.) to be fixed on any glass windows so as to more improve the receiving ability for the millimeter waves.

Furthermore, the composite suction bracket 10 of the 2nd embodiment may include the composite sucker 100 of the aforementioned 1st embodiment and the bracket element 11. Regarding an installing procedure of the composite suction bracket 10, for example, a first to a fourth installing steps of installing the composite suction bracket 10 of the 2nd embodiment may be the same as the first to the fourth installing steps, respectively, of installing the composite sucker 100 of the aforementioned 1st embodiment and are not described again herein.

In addition, as shown in FIG. 1A to FIG. 1D and FIG. 1I, in the third installing step of installing the composite suction bracket 10, the adhesive element 110 is taken to be aligned along the suction element 120 and the pressing element 140, and further aligned according to the alignment mark 115 of the adhesive element 110 to be adhered to the attached surface 90, so as to facilitate the bracket element 11 to be fixed with a proper direction to support the object in a following fifth installing step. With reference to FIG. 1F and FIG. 2E, the fifth installing step of installing the composite suction bracket 10 includes installing the bracket element 11 on the adhesive element 110. That is, the bracket element 11 is connected to and fixed on the adapter unit 114 of the adhesive element 110, and then the object is installed and fixed on the bracket element 11. Consequently, the adhesion property of the adhesive units 113 and the support property of the adapter unit 114 are advantageous in enhancing the sucking stability and design flexibility of the composite suction bracket 10. Moreover, a decorative element 15 may be installed on the outer annular surface 152 of the pressure adjusting element 150 for protecting or decorating the composite suction bracket 10.

Specifically, as shown in FIG. 2A and FIG. 2D, each of the external threaded portion 123 and the internal threaded portion 153 is disposed and extended along the central axis z1 of the composite suction bracket 10, and the central axis z1 is parallel to the normal direction n1 of the attached surface 90. An outer edge projected on the attached surface 90 of the bracket element 11 may surround the outer edges projected on the attached surface 90 of the suction element 120 and the pressure adjusting element 150. Therefore, the bracket element 11 can be installed and fixed on the adapter unit 114 of the adhesive element 110 via a positioning structure 12 (as shown in FIG. 2D) of the bracket element 11 and a positioning structure 116 (as shown in FIG. 2B) of the adapter unit 114 being correspondingly connected to each other. Each of the positioning structures 12, 116 may be a threaded structure or other structure, e.g., a snap-fit structure (not shown in drawings). As the suction force between the composite suction bracket 10 and the attached surface 90 is greater, the composite suction bracket 10 can support the heavier object, and the composite suction bracket 10 together with the object are more firmly fixed on the attached surface 90. Furthermore, the composite suction bracket 10 according to the present disclosure allows to be installed on a window or a glass in any desired place by the user. The suction force is increased first by the suction element 120 and the pressing element 140 cooperating to each other, and increased again by the suction element 120 and the pressure adjusting element 150 cooperating to each other, and thereby there is a total of two times to increase the suction force. With being further cooperated by the adhesive units 113, the composite suction bracket 10 is beneficial to be firmly, simply and conveniently fixed on the attached surface 90 together with the object, and is featured with being reusable.

Figure 3A:
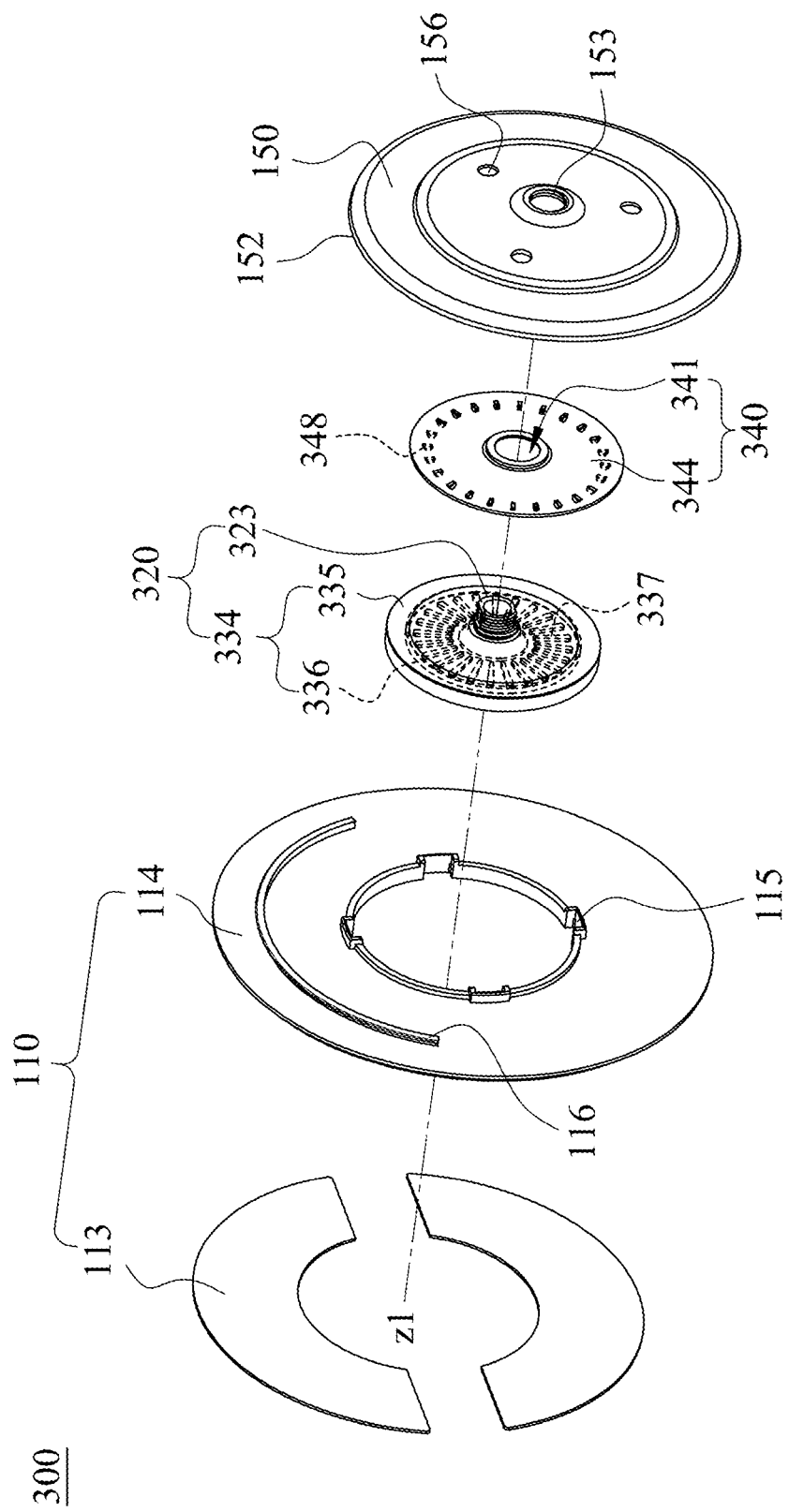
FIG. 3A is an exploded view of a composite sucker according to the 3rd embodiment of the present disclosure.
Figure 3B:
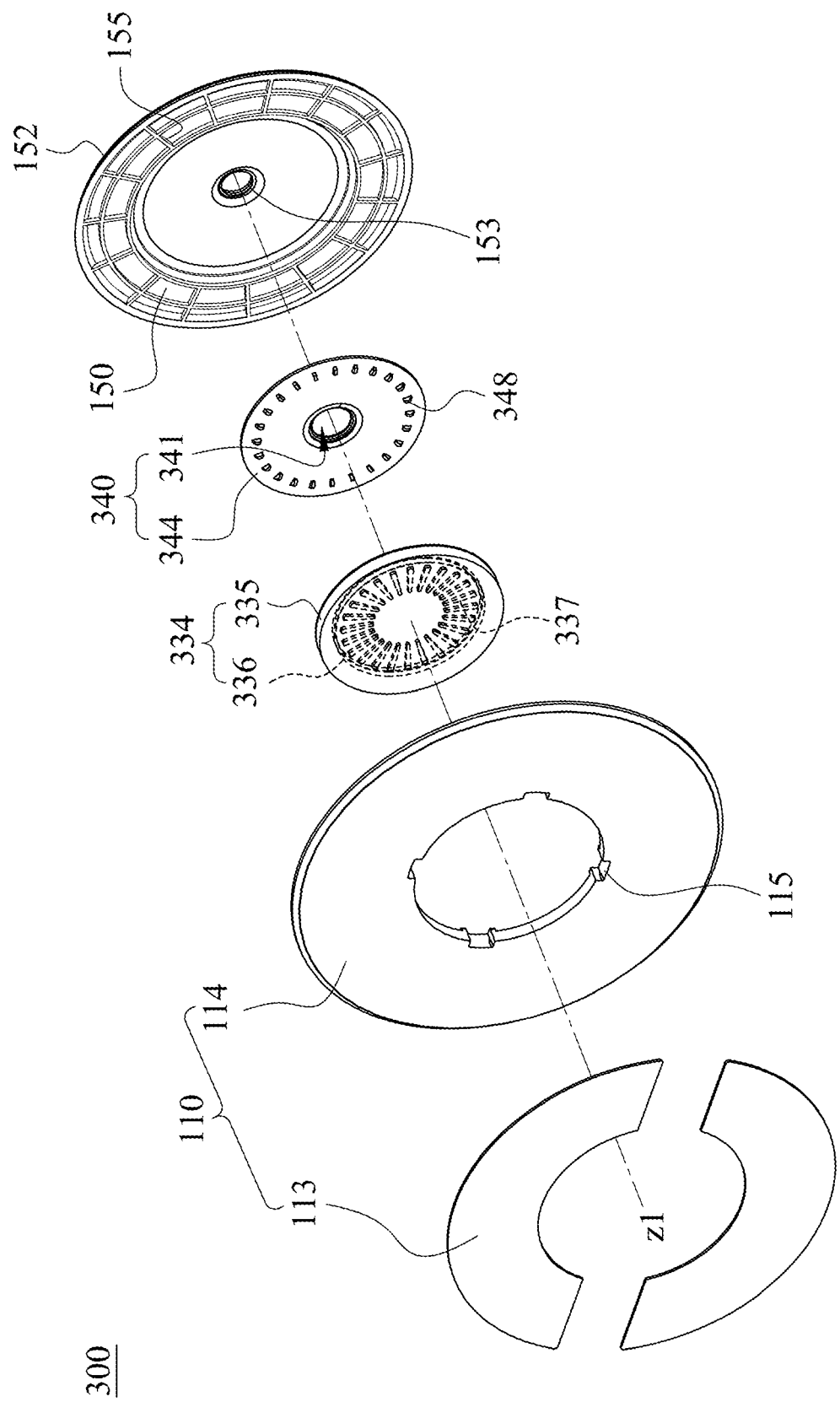
FIG. 3B is another exploded view of the composite sucker according to the 3rd embodiment.
Figure 3C:
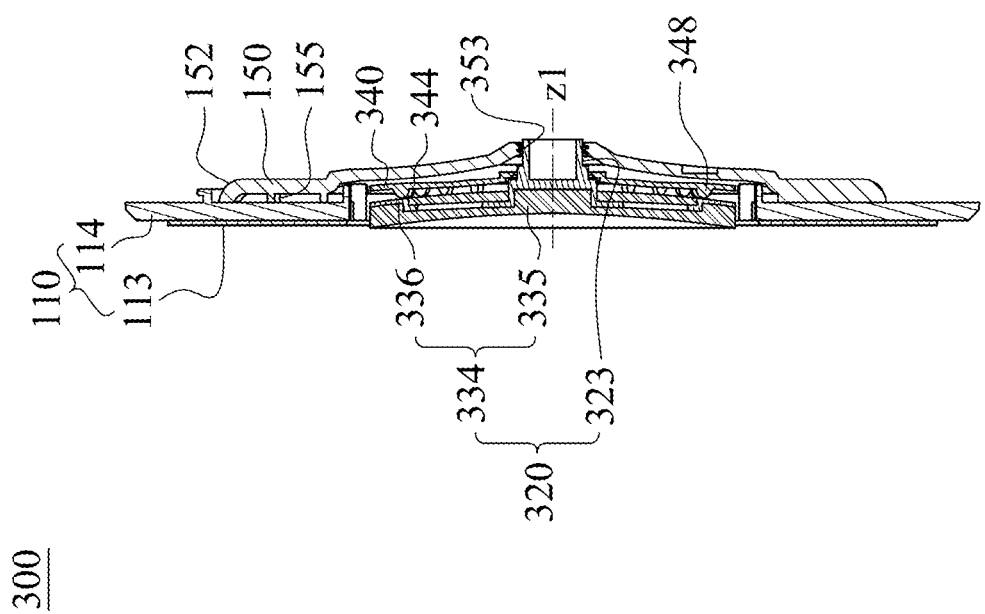
FIG. 3C is a cross-sectional view of the composite sucker according to the 3rd embodiment.
Figure 3D:
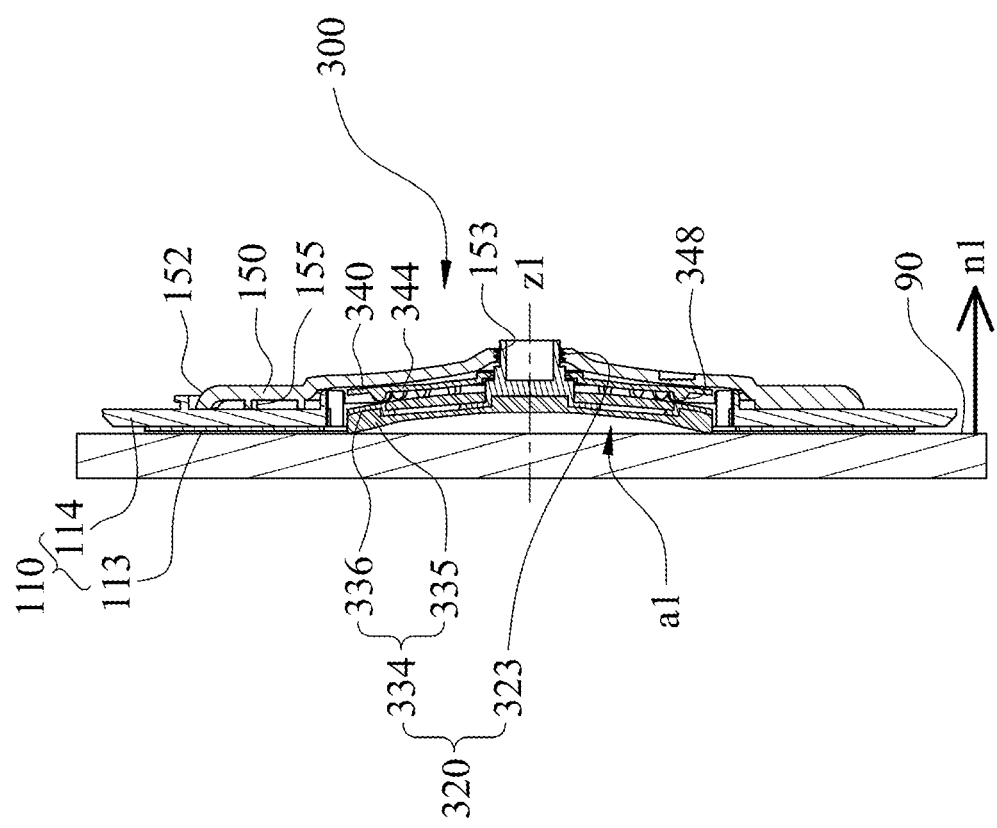
FIG. 3D is a cross-sectional view of the composite sucker according to the 3rd embodiment in a usage state.

FIG. 3A is an exploded view of a composite sucker 300 according to the 3rd embodiment of the present disclosure. FIG. 3B is an exploded view from another view angle of the composite sucker 300 according to the 3rd embodiment. FIG. 3C is a cross-sectional view of the composite sucker 300 according to the 3rd embodiment. FIG. 3D is a cross-sectional view of the composite sucker 300 according to the 3rd embodiment in a usage state of being sucked on the attached surface 90. With reference to FIG. 3A to FIG. 3D, the composite sucker 300 is for being sucked on the attached surface 90 of the attached object. The composite sucker 300 includes a suction element 320 and the pressure adjusting element 150. The suction element 320 is for being connected to and sucked on the attached surface 90. The suction element 320 includes a suction elastic portion 334. An air space a1 is formed between the suction elastic portion 334 and the attached surface 90. The pressure adjusting element 150 is connected to the suction element 320. The pressure adjusting element 150 is able to drive the suction elastic portion 334 to be deformed, so that a volume of the air space a1 is able to become greater.

In detail, the composite sucker 300 further includes a pressing element 340 and the adhesive element 110. The pressing element 340 is connected to the suction element 320 and includes a pressing elastic portion 344. The pressing elastic portion 344 is disposed farther away from the attached surface 90 than the suction elastic portion 334 therefrom, and the pressing elastic portion 344 and the suction elastic portion 334 are driven to be deformed by each other. The adhesive element 110 is for being connected and adhering to the attached surface 90. Each of the suction element 320 and the adhesive element 110 is connected between the attached surface 90 and the pressure adjusting element 150. When the suction elastic portion 334 of the suction element 320 is driven to be deformed by the internal threaded portion 153 of the pressure adjusting element 150, and the volume of the air space a1 becomes greater, a normal force applied on the adhesive element 110 by the pressure adjusting element 150 becomes greater.

The suction element 320 may further include an external threaded portion 323. The suction elastic portion 334 of the suction element 320 surrounds and is connected to the external threaded portion 323 thereof. The pressing element 340 further includes an opening 341, and the pressing element 340 is sleeved around the external threaded portion 323 via the opening 341. The pressure adjusting element 150 includes the internal threaded portion 153, and the external threaded portion 323 and the internal threaded portion 153 are correspondingly connected to each other. The suction elastic portion 334 of the suction element 320 is driven to be deformed by the internal threaded portion 153 while the pressure adjusting element 150 being rotated, and the volume of the air space a1 can be enlarged.

Each of the external threaded portion 323 and the internal threaded portion 153 may be disposed and extended along a central axis z1 of the composite sucker 300, and the central axis z1 is parallel to the normal direction n1 of the attached surface 90. The outer edge projected on the attached surface 90 of the pressure adjusting element 150 surrounds an outer edge projected on the attached surface 90 of the suction element 320.

Figure 3F:
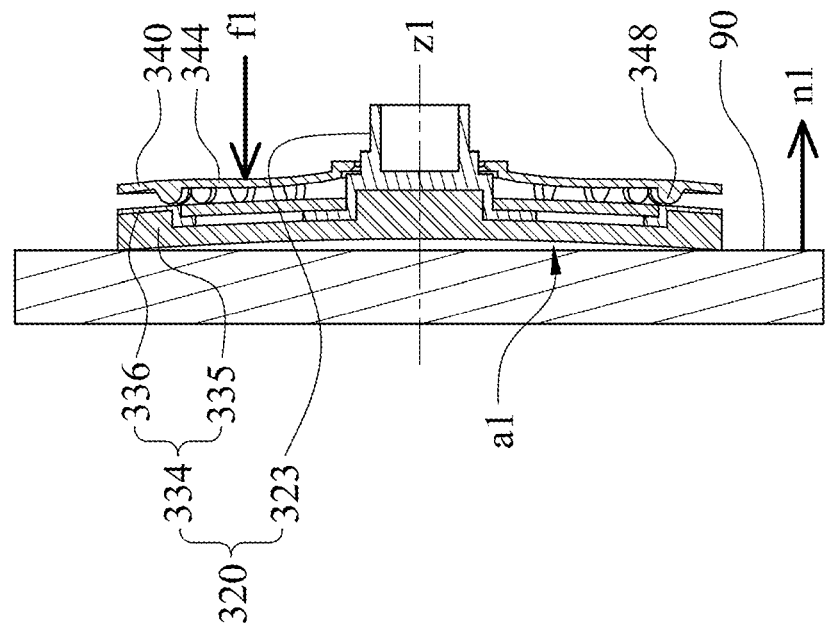
FIG. 3F is a schematic view of a second installing step of the composite sucker according to the 3rd embodiment.
Figure 3E:
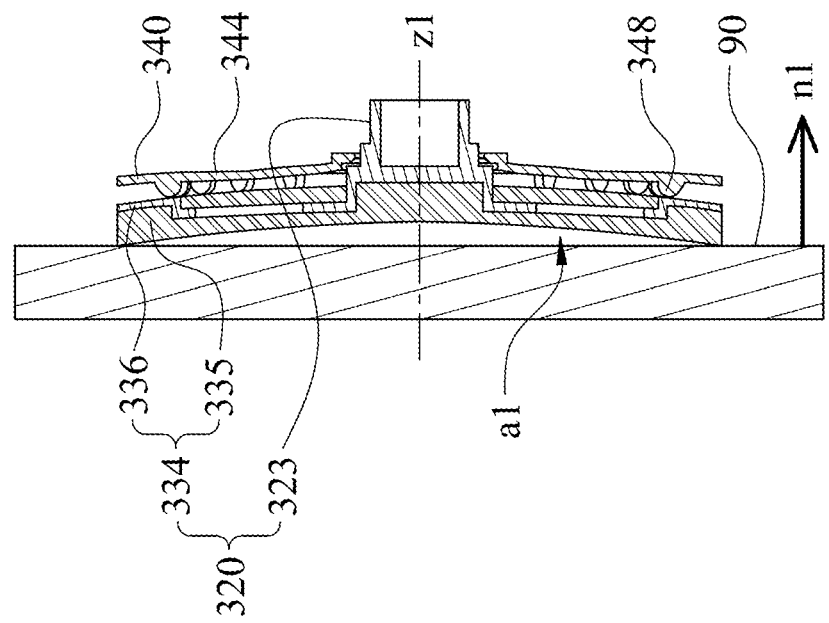
FIG. 3E is a schematic view of a first installing step of the composite sucker according to the 3rd embodiment.

FIG. 3E is a schematic view of a first installing step of the composite sucker 300 according to the 3rd embodiment. FIG. 3F is a schematic view of a second installing step of the composite sucker 300 according to the 3rd embodiment. Specifically, except the suction element 320 and the pressing element 340, each of other elements of the composite sucker 300 of the 3rd embodiment may be the same as the corresponding one of the elements of the composite sucker 100 of the aforementioned 1st embodiment. Furthermore, an installing procedure and steps thereof of installing the composite sucker 300 may be the same as the installing procedure and steps thereof of installing the composite sucker 100 of the aforementioned 1st embodiment, and the schematic views shown in FIG. 3E and FIG. 3F can be referred for the first and second installing steps, respectively, of installing the composite sucker 300.

The pressing elastic portion 344 includes a plurality of abutting blocks 348. The abutting blocks 348 are annularly arranged and abutted with the suction elastic portion 334 of the suction element 320. An elasticity of the pressing elastic portion 344 is smaller than an elasticity of the suction elastic portion 334. Accordingly, it is beneficial to the user to apply an external force f1 on the pressing elastic portion 344 in the second installing step (as shown in FIG. 3F) so as to increase the closeness between the suction elastic portion 334 and the attached surface 90. In addition, the suction elastic portion 334 includes a backbone unit 336 and a filling unit 335. The backbone unit 336 surrounds the external threaded portion 323 and includes a radial-shaped backbone 337. The filling unit 335 covers the backbone unit 336.

Regarding details of the structures and the installing steps of the composite sucker 300 of the 3rd embodiment, the contents of the composite sucker 100 of the aforementioned 1st embodiment can be referred, and the details are not described again herein.

With reference to FIG. 3A, FIG. 3B and FIG. 3D, a composite suction bracket of the 4th embodiment is for being sucked on an attached surface to support an object. The composite suction bracket includes the suction element 320, the adhesive element 110 and the pressure adjusting element 150 of the 3rd embodiment and the bracket element 11 of the 2nd embodiment. The bracket element 11 is connected to at least one of the suction element 320, the adhesive element 110 and the pressure adjusting element 150 for supporting the object. In the 4th embodiment, the bracket element 11 is specifically connected to the adhesive element 110, and not connected to the suction element 320 and the pressure adjusting element 150.

Specifically, the composite suction bracket of the 4th embodiment may include the composite sucker 300 of the aforementioned 3rd embodiment and the bracket element 11, and a first to a fifth installing steps of installing the composite suction bracket of the 4th embodiment may be the same as the first to the fifth installing steps, respectively, of installing the composite suction bracket 10 of the 2nd embodiment. Regarding details of the structures and the installing steps of the composite suction bracket of the 4th embodiment, the contents of the composite suction bracket 10 of the 2nd embodiment and the composite sucker 300 of the 3rd embodiment can be referred, and the details are not described again herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A composite sucker, for being sucked on an attached surface, the composite sucker comprising:
    a suction element for being connected to and sucked on the attached surface, wherein the suction element comprises a suction elastic portion, and an air space is formed between the suction elastic portion and the attached surface;
    a pressing element connected to the suction element, wherein the pressing element comprises a pressing elastic portion, the pressing elastic portion is disposed farther away from the attached surface than the suction elastic portion therefrom, and the pressing elastic portion and the suction elastic portion are driven to be deformed by each other;
    an adhesive element for being connected and adhering to the attached surface, wherein the adhesive element comprises an adhesive unit and an adapter unit, the adhesive unit has adhesiveness, and the adhesive unit is for being connected and adhering between the attached surface and the adapter unit; and
    a pressure adjusting element connected to the suction element, wherein the pressure adjusting element is able to drive the suction elastic portion to be deformed, so that a volume of the air space is able to become greater, and the pressure adjusting element is abutted with the adapter unit.

2. The composite sucker of claim 1, wherein the suction element further comprises an external threaded portion, the pressure adjusting element comprises an internal threaded portion, the external threaded portion and the internal threaded portion are connected to each other, and the suction elastic portion of the suction element is driven to be deformed by the internal threaded portion of the pressure adjusting element while the pressure adjusting element being rotated.

3. The composite sucker of claim 2, wherein the suction elastic portion of the suction element surrounds and is connected to the external threaded portion thereof, the pressing element further comprises an opening, and the pressing element is sleeved around the external threaded portion;
    wherein when an external force toward the attached surface is applied on the suction elastic portion via the pressing elastic portion, the suction elastic portion is driven to be deformed by the pressing elastic portion, and the volume of the air space becomes smaller.

4. The composite sucker of claim 2, wherein each of the external threaded portion and the internal threaded portion is disposed and extended along a central axis of the composite sucker, the central axis is parallel to a normal direction of the attached surface, and an outer edge projected on the attached surface of the pressure adjusting element surrounds an outer edge projected on the attached surface of the suction element.

5. The composite sucker of claim 2,
    wherein each of the suction element and the adhesive element is connected between the attached surface and the pressure adjusting element;
    wherein when the suction elastic portion of the suction element is driven to be deformed by the internal threaded portion of the pressure adjusting element, and the volume of the air space becomes greater, a pressure applied on the adhesive element by the pressure adjusting element becomes greater.

6. The composite sucker of claim 5, wherein the pressure adjusting element comprises a protruding structure, which is abutted with the adapter unit.

7. The composite sucker of claim 2, wherein the suction elastic portion comprises a backbone unit and a filling unit, the backbone unit surrounds the external threaded portion and comprises a radial-shaped backbone, the radial-shaped backbone is extended to form a plurality of abutting blocks, the filling unit covers parts of the radial-shaped backbone, the abutting blocks are exposed from the filling unit, the abutting blocks are abutted with the pressing elastic portion of the pressing element, and an elasticity of the pressing elastic portion is smaller than an elasticity of the suction elastic portion.

8. The composite sucker of claim 1, wherein the pressing elastic portion comprises a plurality of abutting blocks, the abutting blocks are annularly arranged and abutted with the suction elastic portion of the suction element, and an elasticity of the pressing elastic portion is smaller than an elasticity of the suction elastic portion.

9. A composite suction bracket, for being sucked on an attached surface to support an object, the composite suction bracket comprising:

a suction element for being connected to and sucked on the attached surface, wherein the suction element comprises a suction elastic portion, and an air space is formed between the suction elastic portion and the attached surface;

an adhesive element for being connected and adhering to the attached surface, wherein the adhesive element comprises an adhesive unit and an adapter unit, the adhesive unit has adhesiveness, and the adhesive unit is for being connected and adhering between the attached surface and the adapter unit;

a pressure adjusting element, wherein each of the suction element and the adhesive element is connected between the attached surface and the pressure adjusting element, the pressure adjusting element is able to drive the suction elastic portion to be deformed, so that a volume of the air space is able to become greater, and the pressure adjusting element is abutted with the adapter unit; and a bracket element connected to at least one of the suction element, the adhesive element and the pressure adjusting element for supporting the object.

10. The composite suction bracket of claim 9, wherein the suction element further comprises an external threaded portion, the pressure adjusting element comprises an internal threaded portion, the external threaded portion and the internal threaded portion are connected to each other, and the suction elastic portion of the suction element is driven to be deformed by the internal threaded portion of the pressure adjusting element while the pressure adjusting element being rotated.

11. The composite suction bracket of claim 10, wherein when the suction elastic portion of the suction element is driven to be deformed by the internal threaded portion of the pressure adjusting element, and the volume of the air space becomes greater, a pressure applied on the adhesive element by the pressure adjusting element becomes greater.

12. The composite suction bracket of claim 10, wherein the suction elastic portion of the suction element surrounds and is connected to the external threaded portion thereof, each of the external threaded portion and the internal threaded portion is disposed and extended along a central axis of the composite suction bracket, the central axis is parallel to a normal direction of the attached surface, and an outer edge projected on the attached surface of the bracket element surrounds an outer edge projected on the attached surface of each of the suction element and the pressure adjusting element.

13. The composite suction bracket of claim 9, wherein the suction element and the adhesive element are not connected to each other, and the adhesive element is annular-shaped and surrounds the suction element.

14. The composite suction bracket of claim 9, wherein the adhesive unit is a bio-inspired tape.

15. The composite suction bracket of claim 9, further comprising:

a pressing element connected to the suction element, wherein the pressing element comprises a pressing elastic portion, the pressing elastic portion is disposed farther away from the attached surface than the suction elastic portion therefrom, and the pressing elastic portion and the suction elastic portion are driven to be deformed by each other;

wherein when an external force toward the attached surface is applied on the suction elastic portion via the pressing elastic portion, the suction elastic portion is driven to be deformed by the pressing elastic portion, and the volume of the air space becomes smaller.

\* \* \* \* \*